US008412245B2

(12) United States Patent
Delaval

(10) Patent No.: US 8,412,245 B2
(45) Date of Patent: Apr. 2, 2013

(54) SCHEDULING INFORMATION METHOD AND RELATED COMMUNICATIONS DEVICES

(75) Inventor: Guillaume Delaval, Reading (GB)

(73) Assignee: NEC Corporation, Tokyo (JP)

( * ) Notice: Subject to any disclaimer, the term of this patent is extended or adjusted under 35 U.S.C. 154(b) by 516 days.

(21) Appl. No.: 12/597,690

(22) PCT Filed: Apr. 23, 2008

(86) PCT No.: PCT/JP2008/058301
§ 371 (c)(1),
(2), (4) Date: Oct. 26, 2009

(87) PCT Pub. No.: WO2008/136489
PCT Pub. Date: Nov. 13, 2008

(65) Prior Publication Data
US 2010/0120459 A1    May 13, 2010

(30) Foreign Application Priority Data

Apr. 27, 2007 (GB) .................................. 0708203.5

(51) Int. Cl.
*H04W 4/00* (2009.01)
*H04B 7/00* (2006.01)
(52) U.S. Cl. ......... 455/509; 370/259; 370/328; 370/329
(58) Field of Classification Search .................. 455/509;
370/259, 328, 329
See application file for complete search history.

(56) References Cited

U.S. PATENT DOCUMENTS 6,374,112 B1 * 4/2002 Widegren et al. .......... 455/452.2
6,671,512 B2 * 12/2003 Laakso ......................... 455/453
7,336,610 B2 * 2/2008 Lenzini et al. ................ 370/235

(Continued)

FOREIGN PATENT DOCUMENTS
CN    1780179 A    5/2006
EP    1816883 A1    8/2007

(Continued)

OTHER PUBLICATIONS

Communication, dated Nov. 16, 2011, issued by the State Intellectual Property Office of the People's Republic of China in corresponding Chinese Application No. 200880013829.8.

*Primary Examiner* — Bobbak Safaipour
(74) *Attorney, Agent, or Firm* — Sughrue Mion, PLLC

(57) ABSTRACT

In a method of providing scheduling information for use at the mobile radio communications network device for UL resource allocation at the mobile radio communications device between a plurality of Radio Bearers, wherein each Radio Bearer has a Prioritized Bit Rate and at least one Radio Bearer comprises a Guaranteed Bit Rate Radio Bearer.
The mobile radio communications device estimates the average bit rate transmitted for each of the plurality of Radio Bearers over a time period and generates rate control data responsive to determination of one or more of the following parameters:
  for each Guaranteed Bit Rate Radio Bearer whether a maximum Bit Rate has been reached;
  for each Guaranteed Bit Rate Radio Bearer whether the Prioritized Bit Rate has been reached;
  whether one or the Guaranteed Bit Rate Radio Bearers has been served during the said time period;
  whether a total estimated data rate for at least one Guaranteed Bit Rate Radio Bearer does not exceed an Aggregate Maximum Bit Rate value;
  for each Non-Guaranteed Bit Rate Radio Bearer whether the Prioritized Bit Rate is achieved;
  whether at least one Non-Guaranteed Bit Rate Radio Bearer is served during the said time period.

22 Claims, 2 Drawing Sheets

U.S. PATENT DOCUMENTS

| | | | |
|---|---|---|---|
| 7,630,378 B2* | 12/2009 | Kleo | 370/395.21 |
| 2004/0057420 A1* | 3/2004 | Curcio et al. | 370/352 |
| 2004/0071086 A1* | 4/2004 | Haumont et al. | 370/230 |
| 2004/0165596 A1* | 8/2004 | Garcia et al. | 370/395.21 |
| 2006/0018277 A1 | 1/2006 | Petrovic et al. | |
| 2006/0291395 A1* | 12/2006 | Ketonen et al. | 370/236 |
| 2008/0144568 A1* | 6/2008 | Usuda et al. | 370/329 |
| 2008/0212524 A1* | 9/2008 | Niwano | 370/329 |
| 2009/0052384 A1* | 2/2009 | Zisimopoulous et al. | 370/329 |
| 2009/0061876 A1* | 3/2009 | Ho et al. | 455/436 |
| 2009/0168793 A1* | 7/2009 | Fox et al. | 370/412 |
| 2011/0075744 A1* | 3/2011 | Laselva et al. | 375/259 |
| 2011/0134863 A1* | 6/2011 | Zisimopoulous et al. | 370/329 |
| 2011/0170506 A1* | 7/2011 | Zisimopoulous et al. | 370/329 |

FOREIGN PATENT DOCUMENTS

| | | |
|---|---|---|
| JP | 2006-060789 A | 3/2006 |
| WO | 2007/011301 A1 | 1/2007 |
| WO | 2007/066900 A1 | 6/2007 |

* cited by examiner

| Rate Control Flag (RCF) | GBR related | | | Non-GBR related | | |
|---|---|---|---|---|---|---|
| | CRITERIA1 (MBR is reached for at least one RB) | CRITERIA2 (PBR is achieved for all RB) | CRITERIA3 (at least one RB has not been served during $T_{comb}$) | CRITERIA4 (AMBR is achieved for all groups of non-GBR RB) | CRITERIA5 (PBR is achieved for all RB) | CRITERIA6 (at least one RB has not been served during $T_{comb}$) |
| 000 | No | No | ✓ | No | No | ✓ |
| 001 | No | No | No | No | No | ✓ |
| 010 | No | No | No | No | No | No |
| 011 | No | ✓ | No | No | No | No |
| 100 | No | ✓ | No | No | ✓ | No |
| 101 | ✓ | ✓ | No | No | ✓ | No |
| 110 | ✓ | ✓ | No | ✓ | ✓ | No |
| 111 | Reserved | | | | | |

Fig.1

| Rate Control Flag (RCF) | GBR related | | Non-GBR related | |
|---|---|---|---|---|
| | CRITERIA1 (MBR is reached for at least one RB) | CRITERIA2 (PBR is achieved for all RB) | CRITERIA4 (AMBR is achieved for all groups of non-GBR RB) | CRITERIA5 (PBR is achieved for all RB) |
| 00 | No | No | No | No |
| 01 | No | ✓ | No | No |
| 10 | No | ✓ | No | ✓ |
| 11 | ✓ | ✓ | ✓ | ✓ |

Fig.2

SCHEDULING INFORMATION METHOD AND RELATED COMMUNICATIONS DEVICES

TECHNICAL FIELD

The present invention relates to a method of providing scheduling information within a mobile radio communications network and, further, to a mobile radio communications device, and mobile radio communications network device arranged for use in such a network.

BACKGROUND ART

With the increase in the overall number of mobile radio communications device handsets in use, and a corresponding increase in their level of functionality, operational aspects relating in particular to network considerations such as quality and volume of data to be transmitted/received, and/or service potential due to overload conditions are becoming increasing important.

Various mechanisms are known for seeking to allocate radio resources between the various cells, radio bearers, and handset devices that may be found within a network.

For example, in the context of LTE standardization process in 3GPP, it has been agreed that UL resource allocation will be performed at the eNobeB (eNB) side. This means that the eNB will have to allocate resources for each UE in the cell. Such resources to be granted by eNB can comprise an indication of the number of bits that can be transmitted in a given TTI period. Such resources are granted on a per UE basis and not per radio bearer.

Once a given UE has been granted its resource capacity, it has to share this UL resource between its configured radio bearers. This is achieved by a "Rate Control" algorithm. The Rate Control algorithm will decide how many bits from each UL Radio Bearer (RB) will be transmitted on a per TTI basis. The algorithm can use the resource capacity that it has been allocated as well as the Quality of Service (QoS) parameters of each RB.

In addition, it is considered that the UE should be arranged to calculate data that can be sent to the eNB in order to assist with the UL resource allocation to be achieved in the eNB for each of the UE devices.

However, matters of UL signaling overhead arise in relation to such a scenario and can prove disadvantageously limiting.

DISCLOSURE OF THE INVENTION

The present invention seeks to provide for a method of providing scheduling information, and to related communications devices, which offer advantages in relation to such methods and devices.

In particular, the present invention seeks to provide for a scheduling information mechanism which can advantageously achieve a compromise between signaling overhead and the requirement for sufficient information transmission for network purposes.

According to a first aspect of the present invention, there is provided a method of providing scheduling information for delivery from a mobile radio communications device to a mobile radio communications network device within a mobile radio communications network, for use at the mobile radio communications network device for UL resource allocation at the mobile radio communications device and between a plurality of Radio Bearers, wherein each of the plurality of Radio Bearers has a Prioritized Bit Rate and comprises either a Guaranteed Bit Rate or Non-Guaranteed Bit Rate Radio Bearer; the method including the steps of; at the mobile radio communications device estimating the average bit rate transmitted for each of the plurality of Radio Bearers over a time period, and generating rate control data responsive to a determination of one or more of:

for each Guaranteed Bit Rate Radio Bearer whether a maximum Bit Rate has been reached;

for each Guaranteed Bit Rate Radio Bearer whether the Prioritized Bit Rate has been reached;

whether one or the Guaranteed Bit Rate Radio Bearers has been served during the said time period;

whether a total estimated data rate for at least one Non-Guaranteed Bit Rate Radio Bearer does not exceed an Aggregate Maximum Bit Rate value;

for each Non-Guaranteed Bit Rate Radio Bearer whether the Prioritized Bit Rate is achieved; and whether at least one Non-Guaranteed Bit Rate Radio Bearer is served during the said time period;

and further including the step of including the said rate control data within the said scheduling information.

Advantageously, the present invention can support a scheduling information report to a mobile radio communications network device, such as an eNB, as will be discussed further below, and advantageously serves to reduce the UL signaling overhead while providing sufficient information for the eNB scheduler to share UL resources between different users.

Advantageously therefore, the mobile radio communications network device can comprise an eNB.

Yet further, the aforementioned time period can be defined by reference to a number of Transmission Timing Intervals (TTI).

As a further advantageous feature, the data rate measurement can then effectively be updated every Transmission Timing Interval, as can then the criteria decisions (i.e. on a sliding window principle).

The method can also be arranged such that the aforementioned time period can be set-up via the network, or, alternatively, calculated at the mobile radio communications device and, preferably, as based on active UL bearer configuration.

Additionally, the aforementioned time period can be configured on a per bearer basis.

In one particular embodiment, buffer occupancy data can be included with the rate control data and can comprise at least one of:

total buffer occupancy for all bearers:

buffer occupancy for Guaranteed Bit Rate Bearers only;

buffer occupancy for Non-Guaranteed Bit Rate Bearers only;

buffer occupancy for Guaranteed Bit Rate Bearers and buffer occupancy for Non-Guaranteed Bit Rate Bearers;

buffer occupancy of the highest priority Guaranteed Bit Rate Bearer not achieving its allocated Prioritized Bit Rate;

buffer occupancy of the lowest Prioritized Non-Guaranteed Bit Rate Bearer that is not achieving its allocated Priority Bit Rate;

buffer occupancy of the lowest Priority Non-Guaranteed Bit Rate Bearer that is not achieving its allocated Priority Bit Rate over the aforementioned time period;

buffer occupancy of the highest Priority Non-Guaranteed Bit Rate Bearer that is achieving its allocated maximum bit rate; and buffer occupancy of the lowest Priority Non-Guaranteed Bit Rate Bearer that is achieving its allocated minimum bit rate.

Of course, the buffer occupancy data can comprise a combination of reports relating to any one or more of the above.

In one particular embodiment, the scheduling information can be mapped onto bits carried by the Physical Uplink Control Channel.

As an alternative, the scheduling information can be transmitted within MAC transport blocks.

According to another aspect of the present invention there is provided a mobile radio communications device arranged for delivering scheduling information to a mobile radio communications network device within a mobile radio communications network and for use in the mobile radio communications network device for UL resource allocation at the mobile radio communications device and over a plurality of radio bearers, wherein each of that plurality of radio bearers has a Prioritized Bit Rate and comprises a Guaranteed Bit Rate or Non-Guaranteed Bit Rate radio bearer, the mobile radio communications device being arranged to estimate the average bit rate transmitted for each of the plurality of radio bearers over a time period, and including means for generating rate control data responsive to a determination of one or more of:

for each Guaranteed Bit Rate Radio Bearer whether a maximum Bit Rate has been reached;

for each Guaranteed Bit Rate Radio Bearer whether the Prioritized Bit Rate has been reached;

whether one or the Guaranteed Bit Rate Radio Bearers has been served during the said time period;

whether a total estimated data rate for at least one Non-Guaranteed Bit Rate Radio Bearer does not exceed an Aggregate Maximum Bit Rate value;

for each Non-Guaranteed Bit Rate Radio Bearer whether the Prioritized Bit Rate is achieved; and said whether at least one Non-Guaranteed Bit Rate Radio Bearer is served during the time period;

and the mobile radio communications device being arranged to include the said generated rate control data within the said scheduling information.

As above, the said radio bearers can include a Non-Guaranteed Bit Radio Bearer and the rate control data can comprise a rate control flag.

Also, the time period can be defined by a number of Transmission Time Intervals and, further, the device can be arranged such that the aforesaid time period is updated every Transmission Time Interval.

In one embodiment, the mobile radio communications device can be arranged to calculate the aforementioned time period preferably, as based on the active UL bearer configuration.

However, in particular, the aforementioned time period can be configured on a per radio bearer basis.

The mobile radio communications device can also be arranged to include buffer occupancy data within the rate control data.

As above, the buffer occupancy data can comprise at least one of:

total buffer occupancy for all bearers;

buffer occupancy for Guaranteed Bit Rate Bearers only;

buffer occupancy for Non-Guaranteed Bit Rate Bearers only;

buffer occupancy for Guaranteed Bit Rate Bearers and buffer occupancy for Non-Guaranteed Bit Rate Bearers;

buffer occupancy of the highest priority Guaranteed Bit Rate Bearer not achieving its allocated Prioritized Bit Rate;

buffer occupancy of the lowest Prioritized Non-Guaranteed Bit Rate Bearer that is not achieving its allocated Priority Bit Rate;

buffer occupancy of the lowest Priority Non-Guaranteed Bit Rate Bearer that is not achieving its allocated Priority Bit Rate over the aforementioned time period;

buffer occupancy of the highest Priority Non-Guaranteed Bit Rate Bearer that is achieving its allocated maximum bit rate; and buffer occupancy of the lowest Priority Non-Guaranteed Bit Rate Bearer that is achieving its allocated minimum bit rate.

Yet further, the device can be arranged such that the scheduling information is mapped onto bits carried by the Physical Uplink Control Channel.

As with the alternative discussed above, the device can be arranged such that the scheduling information is transmitted within MAC transport blocks.

In accordance with a further aspect of the present invention there is provided a mobile radio communications network device arranged for receiving scheduling information from a mobile radio communications device within a mobile radio communications network, the network device being arranged for UL resource allocation between a plurality of radio bearers at the mobile radio communications device and wherein each radio bearer has a Prioritized Bit Rate and at least one radio bearer comprises a Guaranteed Bit Rate Radio Bearer, the mobile radio communications network device being arranged to receive rate control data from the mobile radio communications device, wherein the rate control data is included within the scheduling information which, in a preferred embodiment, can be mapped onto bits carried by the Physical Uplink Control Channel or can be alternatively, transmitted inside MAC transport blocks.

Preferably, the mobile radio communications network device can comprise an eNB.

Yet further, the radio bearers can include Non-Guaranteed Bit Rate Radio Bearers and Guaranteed Bit Rate Bearers.

Also, the network device is arranged to receive the rate control data in the form of a rate control flag.

According to a further feature of the present invention, there is provided a mobile radio communications system including at least one mobile radio communications device, and at least one mobile radio communications network device as defined above.

As will therefore be appreciated from the above, a particular feature of the present invention is that a mobile radio communications device can be arranged to follow the rate control algorithm status for each configured radio bearer on a per-Transmission Timing Interval (TTI) basis and so as to subsequently generate a rate control flag as appropriate. This rate control flag effectively comprises a measurement of the mobile radio communications network device functionality that can serve to assist the eNB scheduler to make the most appropriate decision in terms of UL resource allocation at the mobile radio communications device.

As noted, the manner in which the scheduling information can be calculated by the mobile radio communications device, as well as reporting properties within the scheduling information, can be controlled as appropriate via the network.

BRIEF DESCRIPTION OF THE DRAWING

FIG. 1 is a table illustrating three-bit rate control flag mapping according to the embodiment of the present invention;

FIG. 2 is a table illustrating an example of two-bit rate control flag mapping according to an embodiment of the present invention;

BEST MODE FOR CARRYING OUT OF THE INVENTION

Figure 3:
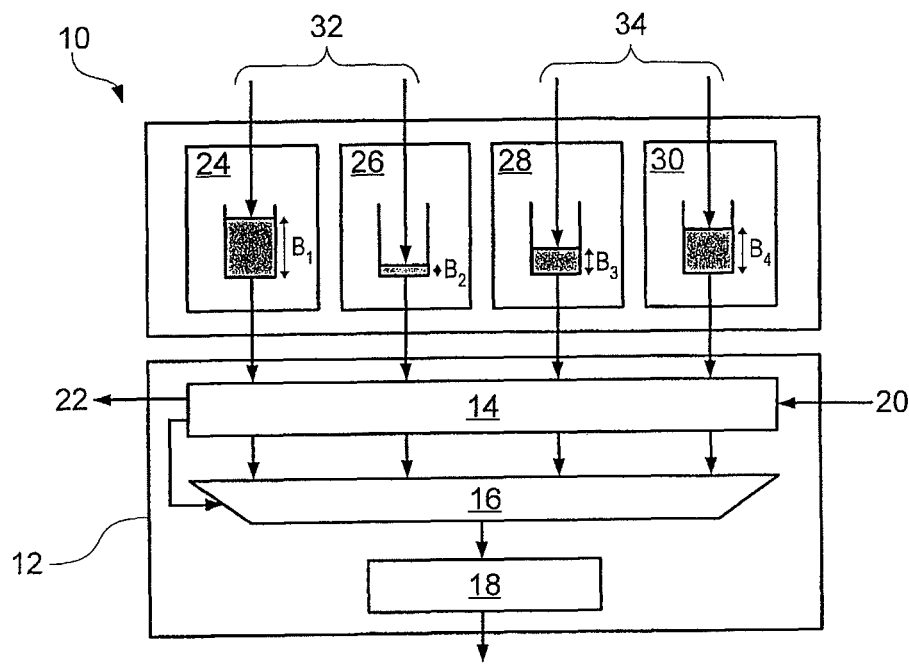
FIG. 3 is a schematic block diagram of functional elements of a mobile radio communications device embodying the present invention.

As will be further appreciated from the following, the invention provides for a mechanism of Scheduling Information (SI) calculation and subsequent reporting. The SI will be calculated by each UE and reported to the network in order to assist with scheduling of the UL transmissions within the cell(s) under its responsibility. While SI reports are known in general, manner of the management can prove to be different from one technology to the other. The invention advantageously serves to reach a compromise to reduce signaling overhead introduced by the SI transmission, while also providing sufficient information for the network to be able to share UL resources between users in an efficient manner.

The present invention proposes a scheme whereby an acceptable overhead can be achieved and that allows the operator to set-up the SI reporting properties, i.e. the flexible mapping of information as well as the manner in which it is calculated by each UE.

Once having been granted its resource allocation by the network, the mobile radio communication device, for example an LTE terminal is taken responsible for sharing those resources (i.e. the number of bits that he can transmit per TTI) between the different Radio Bearers (RB) that are configured. Each radio bearer is characterized by its QoS parameters.

In general, this may require that every Radio Bearer has a Prioritized Bit Rate (PBR) which comprises a minimum bit rate of the UE and should be taken into account while serving each priority queue, or each SAE bearer in a scenario employing LTE. Further, the RBs are split into two categories: Guaranteed Bit Rate (GBR) and non-GBR bearers. GBR bearers will be used, for example, for bearers associated to real time services. Additionally to their PBR value, they are also associated with a Maximum Bit Rate value (MBR); Non-GBR bearers are not associated with an MBR value, although a set of non-GBR bearers may be associated with an Aggregate Maximum Bit Rate (AMBR);

As will be appreciated with reference to the illustrated embodiment, the rate control flag calculation forms an important part of the present invention and can be achieved as follows:

Assuming that n data bearers are configured, for the $j^{th}$ TTI, the UE is transmitting $X_{1,j}$ bits for radio bearer #1, $X_{2,j}$ bits for radio bearer #2, . . . , and $X_{n,j}$ bits for radio bearer #n with the constraint that:

$$\sum_{i=1}^{n} X_{i,j} \leq D_j$$

It should be noted that the number of bits $X_{i,j}$ to be transmitted in TTI j for bearer I will be determined by the rate control algorithm.

$D_j$ denotes the number of bits (i.e. the granted allocation) that can be transmitted by the UE during the $j^{th}$ TTI period. This value can change every TTI (based on eNodeB decision);

The proposed mechanism for this within this specific example includes the following steps:

First, the UE estimates the average bit rate that has been transmitted for each radio bearer over a given time window of length $T_{comb}$. $T_{comb}$ can comprise a number of TTI and these values can be updated every TTI using a sliding window. Thus, the UE is maintaining, on a TTI basis, an estimation of the average bit rate that has been transmitted for each bearer.

$T_{comb}$ can be set up by the network or calculated by the UE based on its active UL bearer configuration.

Additionally, $T_{comb}$ can be configured on a per bearer basis. In such a case, it can be identified as $T_{comb,j}$ where i refers to RB #i. However, a single $T_{comb}$ for all RBs has been considered in the present application.

This step leads to a set of estimated bit rate per bearer which can be identified as $R_{i,j}$ and calculated on the basis of the above expression and as follows:

$$R_{i,j} = \sum_{k=0}^{T_{comb}-1} \left( \frac{X_{i,(j-k)}}{T_{comb}} \right) \text{ (in bits/s)}$$

Secondly, the mobile radio communications device User Equipment (UE) is arranged to check a variety of specific criteria which, as examples, can comprise the following six:

CRITERION 1: the UE checks for each GBR bearer whether the MBR value is reached or not. This criterion can be expressed as:

$$R_{i,j} \leq (MBR_i - \Delta_{MBR,i})$$

Where $\Delta_{MBR,i}$ is an offset that can be signaled by the network. It can be seen as a percentage of $MBR_i$. This parameter can be fixed or signaled by the network.

CRITERION 2: the UE checks for each GBR bearer whether the PBR is achieved. This criterion can be expressed as:

$$R_{i,j} \geq PBR_i$$

CRITERION 3: the UE checks whether at least one of the GBR bearers has been served during the $T_{comb}$ period.

CRITERION 4: the UE checks for each of a group of non-GBR bearers associated with an AMBR value whether the total estimated data rate exceeds the AMBR value:

$$\sum_{\substack{i=1 \\ i \Leftrightarrow non-GBR\_bearer}}^{n} R_{i,j} \leq (AMBR - \Delta_{AMBR,i})$$

Where $\Delta_{AMBRi}$ is an offset that can be signaled by the network. It can be seen as a percentage of the AMBR.

CRITERION 5: the UE checks for each non-GBR bearer whether the PBR is achieved in a manner similar to criteria 3. This criteria can be expressed as:

$$R_{i,j} \geq PBR_i$$

CRITERION 6: here the UE checks whether or not at least one non-GBR bearer has not been served during one $T_{comb}$ period. In other words, it detects starvation of non-GBR bearers.

In addition to MBR, AMBR and PBR, a priority label can be associated with each bearer. Criteria 1 to 6 could be further enhanced in order to introduce the priority label dimension. It should of course be appreciated that the list of criteria above is not exhaustive and that other criteria may be considered for step 3.

On the basis of such criteria-verification as noted above, the rate control flag can then be calculated.

Turning now to FIG. 1, there is provided a table illustrating the mapping of a three-bit rate control flag and each of which configurations, as noted, relates to the criteria outlined above.

Thus, the table illustrates the three-bit representation of the rate control flag and determined upon the basis of whether the various criteria are met.

As illustrated in the table outlined noted above, three of the criteria correspond to Guaranteed Bit Rate RBs, whereas the remaining three relate to Non-Guaranteed Bit Rate RBs.

As will be appreciated, when rate control flag values from 000 to 011 are reported by the UE to the network, this can be taken as a measure that the Prioritized Bit Rate Values are not verified within the specific time period and that the UE device may therefore need greater resource allocation.

With specific reference to the rate control flag at 011, here the Prioritized Bit Rate is in fact verified for the Guaranteed Bit Rate RBs but not for the Non-Guaranteed Bit Rate RBs.

With such an indication, the mobile radio communications network device scheduler can then be arranged to decide if further resources need to be allocated to the particular UE that is the source of that rate control flag.

As will be appreciated above, through the employment of a mere three-bit rate control flag, the UL overhead can be advantageously limited.

Referring now to FIG. 2, an even greater reduction in the UL overhead can be achieved by means of an arrangement generating and employing a two-bit rate control flag.

As illustrated, this can be achieved through the employment of two, rather than three separate criteria for the Guaranteed Bit Rate related to radio bearers and Non-Guaranteed Bit Rate Radio Bearers as previously illustrated with reference to FIG. 1.

The advantage of this method is that while using fewer signaling bits, the eNodeB scheduler will be aware of the UE transmission situation concerning GBR and non-GBR bearers. Thus, it is up to the scheduler decision to allow the UE rate control to guarantee the QoS for all RBs or only for the GBR RBs. This may be typically the case when the UE is camped on a heavily loaded cell.

Another advantage is that even if a fixed number of bits is allocated for this field, the network has the possibility of controlling the meaning of the report. As the UL scheduling algorithm implemented at the eNodeB side is likely to be a proprietary solution, the network may indicate to the UE which bit mapping needs to be considered by the UE among a set of different possibilities. For example, if 3 bits are allocated to the rate control flag field, different mappings may be defined. One will be the example discussed above although other mapping tables may be defined. In that case, the eNodeB may send a control parameter to the UE to indicate which table is used in the calculation of the rate control flag. Since four possible tables are considered in this example, this rate control flag will require two bits as illustrated.

The present invention can also be arranged such that buffer occupancy data can be created and transmitted along with the rate control flag.

Advantageously the manner in which the buffer occupancy can be defined can be signaled by way of the network. The mobile radio communications device can then set up its buffer occupancy report mechanisms as required and can report any one or more of the following and with reference to FIG. 3:

the total buffer occupancy for all bearers (i.e. in the FIG. 3 example BO=B1+B2+B3+B4).

the buffer occupancy of GBR bearers only (i.e. in the FIG. 3 example BO=B1+B2);

the buffer occupancy for non-GBR bearers only (i.e. in the FIG. 3 example BO=B3+B4);

the buffer occupancy of GBR bearers and the buffer occupancy for non-GBR bearers (on two separate fields) i.e. in the FIG. 3 for example (BO_GBR=B1+B2 and BO_nonGBR=B3+B4);

the buffer occupancy of the highest priority GBR bearer that is not achieving its allocated PBR over the $T_{comb}$ time period; identified as BO_GBR_HP;

the buffer occupancy of the highest priority non-GBR bearer that is not achieving its allocated PBR over the $T_{comb}$ time period; identified as BO_nonGBR_HP;

the buffer occupancy of the lowest priority GBR bearer that is not achieving its allocated PBR over the $T_{comb}$ time period; identified as BO_GBR_LP;

the buffer occupancy of the lowest priority non-GBR bearer that is not achieving its allocated PBR over the $T_{comb}$ time period; identified as BO_nonGBR_LP;

the buffer occupancy of the highest priority GBR bearer that is achieving its allocated MBR over the $T_{comb}$ time period; identified as BOJV1BR_HP;

the buffer occupancy of the lowest priority GBR bearer that is achieving its allocated MBR over the $T_{comb}$ time period; identified as BO_MBR_LP; and, if required, a combination of the above defined buffer occupancy reports.

With further reference now to FIG. 3, there is illustrated in schematic block form a mobile radio communications device configuration employing four UL RBs.

The mobile radio communications device 10 includes MAC layer functionality 12 which can comprise a rate control block 14, multiplexing and MAC header addition units 16 and a Hybrid Automatic Repeat Request (HARQ) unit 18.

The MAC 12 functions such that Quality of Service parameters, such as Prioritized Bit Rate, Maximum Bit Rate and Aggregate Maximum Bit Rate, can be introduced at 20 to the rate control unit 14, and required SI 22 output therefrom for subsequent delivery to the mobile radio communications network device such as an eNB (not shown).

To achieve such functionality, the mobile radio communications device 10 also includes radio link control entities 24-30 having respective buffer occupancies $B_1$-$B_4$ as indicated.

The two radio link control entities 24, 26 feed from Guaranteed Bit Rate RBs 32, whereas the two radio link control entities 28, 30 feed from Non-Guaranteed Bit Rate RBs 34.

The buffer occupancy as derived from the radio link control entities 24-30 is, as illustrated, fed to the rate control unit 14 so as to be included as Buffer Occupancy (BO) within the scheduling information 22 and as discussed above.

Once the SI field and the BO field(s) have been calculated by the UE, they can be reported to the eNodeB. A first option is to map those fields onto the bits carried by the PUCCH physical channel.

PUCCH follows a 1 ms. sub-frame structure and so $M_{bits}$ can be transmitted in a sub-frame after channel encoding and $K_{bits}$ bits (before channel encoding) can be allocated to report the SI and BO fields to the network.

Figure 4:
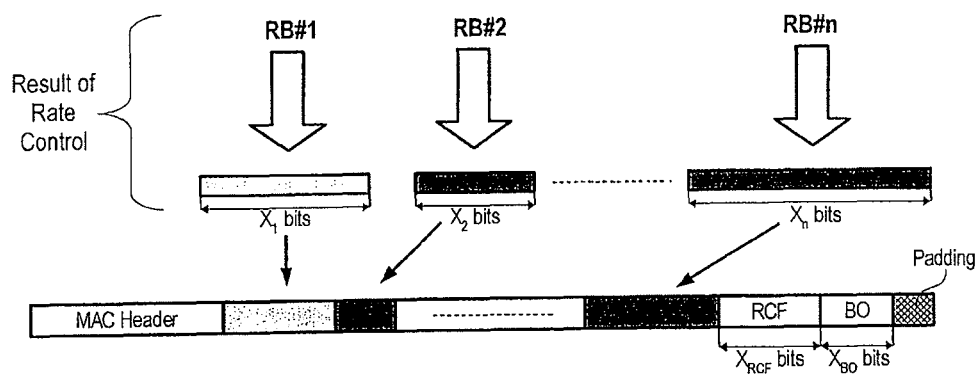
FIG. 4 is a schematic illustration of a MAC transport block and associated rate control flag and buffer occupancy fields according to an embodiment of the present invention.

As an alternative to transmission on the PUCCH channel, the BO and RCF fields can be transmitted inside MAC transport blocks and an example is illustrated in FIG. 4.

Yet further the RCF field can be transmitted on the PUCCH and the BO in a MAC PDU.

The following comprises a list of the parameters that can be employed by the UE to configure the reporting mechanism:

| Parameter name (as employed in this example) | Description |
| --- | --- |
| $T_{comb}$ | Window length expressed as a number of TTI. There can be a single value for all the configured bearers, or one value bearer; |
| RCF_conf | The rate control flag may be mapped to a fixed number of bits, but may report different kinds of information based on the eNodeB scheduler needs. This parameter informs the UE of the RCF bit mapping. One example of mapping has been provided in table 1; If, for example, 4 possible mapping tables have been defined, RCF_conf will point to one of them |
| $\Delta_{MBR,i}$ | Offset for 'CRITERIA 1'; |
| $\Delta_{anvru}$ | Offset for 'CRITERIA 4'; |
| RCF_Reporting Cycle | The RCF may be transmitted periodically. This parameter sets up the reporting periodicity. When RCF bits are mapped on PUCCH and when RCF bits are not transmitted in a given PUCCH sub-frame, the available field may be used for another purpose; |
| BO_conf | Buffer Occupancy reporting configuration. This parameter is used to set-up the format of the BO field reported by the network; In this proposal, several BO reporting configuration have been defined. This parameter points one of those configuration; |
| BO-Reporting_cycle | The BO may be transmitted periodically. This parameter sets up the reporting periodicity; |

As noted, the above table provides a (non exhaustive) list of parameters that can be set up by the eNodeB and transmitted to the UE for each bearer.

In order to transmit those parameters, three options can be considered:

First, each UE that has an RRC connection set up in the considered cell can be configured similar in a manner. In this case, it is proposed to broadcast the "scheduling report mechanism" configuration parameter on the BCCH channel;

Secondly, each UE can be configured separately and based, for example, on its bearer configuration (i.e. how many UL bearers are configured with which QoS parameters); there the UE can be configured upon establishment of the RRC connection. Use can be made of the DCCH logical channel and the network can reconfigure each UE after one or more new RBs have been added, or after one or more RB has been removed for UL transmissions;

Thirdly, each UE may use a default configuration broadcast by the network using the BCCH channel. Subsequently, the network/eNB may reconfigure each UE having an RRC connection established based on the number of RBs as well as their QoS properties. For that purpose, the eNodeB may use the DCCH channel.

This application is based upon and claims the benefit of priority from United Kingdom application No. 0708203.5, filed on Apr. 27, 2007, the disclosure of which is incorporated herein in its entirety by reference.

The invention claimed is:

1. A method of providing scheduling information for delivery from a mobile radio communications device to a mobile radio communications network device within a mobile radio communications network and for use at the mobile radio communications network device for uplink (UL) resource allocation at the mobile radio communications device and between a plurality of Radio Bearers, wherein each of the plurality of Radio Bearers has a Prioritized Bit Rate and comprises either a Guaranteed Bit Rate or Non-Guaranteed Bit Rate Radio Bearer; the method comprising the steps of:
at the mobile radio communications device, estimating the average bit rate transmitted for each of the plurality of Radio Bearers over a time period;
generating rate control data responsive to determination of at least four of:
whether a maximum Bit Rate has been reached for each Guaranteed Bit Rate Radio Bearer;
whether the Prioritized Bit Rate has been reached for each Guaranteed Bit Rate Radio Bearer;
whether at least one of the Guaranteed Bit Rate Radio Bearers has been served during the said time period;
whether a total estimated data rate for at least one Non-Guaranteed Bit Rate Radio Bearer does not exceed an Aggregate Maximum Bit Rate value;
whether the Prioritized Bit Rate is achieved for each Non-Guaranteed Bit Rate Radio Bearer; and
whether at least one Non-Guaranteed Bit Rate Radio Bearer is served during the said time period,
wherein the said rate control data is included in the said scheduling information.

2. A method as claimed in claim 1, wherein the mobile radio communications network device comprises an eNB.

3. A method as claimed in claim 1, wherein the plurality of radio bearers include Non-Guaranteed Bit Rate Bearers.

4. A method as claimed in claim 1, wherein the Rate Control data comprises a Rate Control flag.

5. A method as claimed in claim 1, wherein the said time period is defined by reference to a number of Transmission Timing Intervals.

6. A method as claimed in claim 5, wherein the data rate measurements are updated every Transmission Timing Interval.

7. A method as claimed in claim 1, wherein the time period can be set-up via the network.

8. A method as claimed in claim 1, wherein the time period is calculated at the mobile radio communications device.

9. A method as claimed in claim 7, wherein the time period is configured on a per radio bearer basis.

10. A method as claimed in claim 1, wherein buffer occupancy report is included with the rate control data.

11. A method as claimed in claim 1, wherein the scheduling information is mapped onto bits carried by a Physical Uplink Control Channel.

12. A method as claimed in claim 7, wherein the scheduling information is arranged to be transmitted within MAC transport blocks.

13. A mobile radio communications device arranged for delivering scheduling information to a mobile radio communications network device within a mobile radio communications network and for use in the mobile radio communications network device for UL resource allocation at the mobile radio communications device and over a plurality of radio bearers, wherein each of the plurality of radio bearers has a Prioritized Bit Rate and comprises either a Guaranteed Bit Rate or Non-Guaranteed Bit Rate radio bearer, the mobile radio communications device being arranged to estimate the average bit rate transmitted for each of the plurality of radio bearers over a time period, the device comprising:
a rate control unit which generates rate control data responsive to a determination of at least four of:
whether a Maximum Bit Rate has been reached for each Guaranteed Bit Rate Radio Bearer;
whether the Prioritized Bit Rate has been reached for each Guaranteed Bit Rate Radio Bearer;
whether at least one of the Guaranteed Bit Rate Radio Bearers has been served during the said time period;

whether a total estimated data rate for at least one Non-Guaranteed Bit Rate Radio Bearer does not exceed an Aggregate Maximum Bit Rate value;
whether the Prioritized Bit Rate is achieved for each Non-Guaranteed Bit Rate Radio Bearer; and
whether at least one Non-Guaranteed Bit Rate Radio Bearer is served during the said time period,
wherein the device being arranged to include the said generated rate control data within the said scheduling information.

14. A device as claimed in claim 13, wherein the said radio bearers include a Non-Guaranteed Bit Rate Radio Bearer.

15. A device as claimed in claim 13, wherein the rate control data comprises a Rate Control Flag.

16. A device as claimed in claim 13, wherein the data rate measurements are defined by a number of Transmission Time Intervals.

17. A device as claimed in claim 13, and arranged to calculate the aforementioned time period.

18. A device as claimed in claim 14 and arranged to include buffer occupancy report with the rate control data.

19. A device as claimed in claim 13 and arranged such that the scheduling information is mapped onto bits carried by a Physical Uplink Control Channel.

20. A device as claimed in claim 13 and arranged such that the scheduling information is transmitted within MAC transport blocks.

21. A mobile radio communications system including at least one mobile radio communications device arranged for delivering scheduling information to a mobile radio communications network device within a mobile radio communications network and for use in the mobile radio communications network device for UL resource allocation at the mobile radio communications device and over a plurality of radio bearers, wherein each of the plurality of radio bearers has a Prioritized Bit Rate and comprises either a Guaranteed Bit Rate or Non-Guaranteed Bit Rate radio bearer, the mobile radio communications device being arranged to estimate the average bit rate transmitted for each of the plurality of radio bearers over a time period, the mobile radio communications device comprising:
a rate control unit which generates rate control data responsive to a determination of at least four of:
whether a Maximum Bit Rate has been reached for each Guaranteed Bit Rate Radio Bearer;
whether the Prioritized Bit Rate has been reached for each Guaranteed Bit Rate Radio Bearer;
whether at least one of the Guaranteed Bit Rate Radio Bearers has been served during the said time period;
whether a total estimated data rate for at least one Non-Guaranteed Bit Rate Radio Bearer does not exceed an Aggregate Maximum Bit Rate value;
whether the Prioritized Bit Rate is achieved for each Non-Guaranteed Bit Rate Radio Bearer; and
whether at least one Non-Guaranteed Bit Rate Radio Bearer is served during the said time period,
wherein the device is configured to include the said generated rate control data within the said scheduling information and at least one mobile radio communications network device,
wherein the mobile radio communications network device is operable in response to the rate control data included within the scheduling information and is configured to perform:
scheduling UL resource allocation at each mobile radio communications device with reference to the above-mentioned rate control data which is generated by the mobile radio communications device.

22. A method as claimed in claim 8, wherein the time period is configured on a per radio bearer basis.

* * * * *